(12) United States Patent
Dahlman et al.

(10) Patent No.: US 7,146,420 B2
(45) Date of Patent: Dec. 5, 2006

(54) INTERNET LISTENER/PUBLISHER

(75) Inventors: Roger A. Dahlman, Nashville, TN (US); Michael W. Pyle, Heritage, TN (US)

(73) Assignee: Square D Company, Palatine, IL (US)

( * ) Notice: Subject to any disclaimer, the term of this patent is extended or adjusted under 35 U.S.C. 154(b) by 386 days.

(21) Appl. No.: 10/717,750

(22) Filed: Nov. 20, 2003

(65) Prior Publication Data

US 2005/0114509 A1    May 26, 2005

(51) Int. Cl.
G06F 15/173    (2006.01)
(52) U.S. Cl. ...................... 709/225; 719/328
(58) Field of Classification Search ............... 709/224, 709/225, 226; 715/505.1; 719/328, 331
See application file for complete search history.

(56) References Cited

U.S. PATENT DOCUMENTS

| 5,805,803 A | 9/1998 | Birrell et al. | |
| 6,088,796 A * | 7/2000 | Cianfrocca et al. | 713/152 |
| 6,510,464 B1 * | 1/2003 | Grantges et al. | 709/225 |
| 6,516,427 B1 | 2/2003 | Keyes et al. | 714/25 |
| 6,553,422 B1 | 4/2003 | Nelson | 709/227 |
| 2002/0116258 A1 | 8/2002 | Stamatelatos et al. | 705/14 |
| 2002/0184170 A1 | 12/2002 | Gilbert et al. | 706/20 |
| 2003/0028577 A1 | 2/2003 | Dorland et al. | 709/100 |
| 2003/0204626 A1 * | 10/2003 | Wheeler | 709/245 |
| 2004/0148328 A1 * | 7/2004 | Matsushima | 709/200 |

FOREIGN PATENT DOCUMENTS

| DE | 10301106 | 8/2003 |
| WO | WO03/084167 | 10/2003 |

OTHER PUBLICATIONS

The Gnutella Protocol Specification v0.4[1], Document Revision 1.2, 10 pages, (est 2001).

* cited by examiner

*Primary Examiner*—Frantz B. Jean

(57) ABSTRACT

A communication scheme which allows Internet access to selected services behind a corporate firewall on a corporate Intranet with a publisher on the Intranet in communication with the Intranet web services and a listener on the Internet and is responsive to select requests from an Internet user which are embedded in responses received from the listener responding to queries from the publisher.

17 Claims, 5 Drawing Sheets

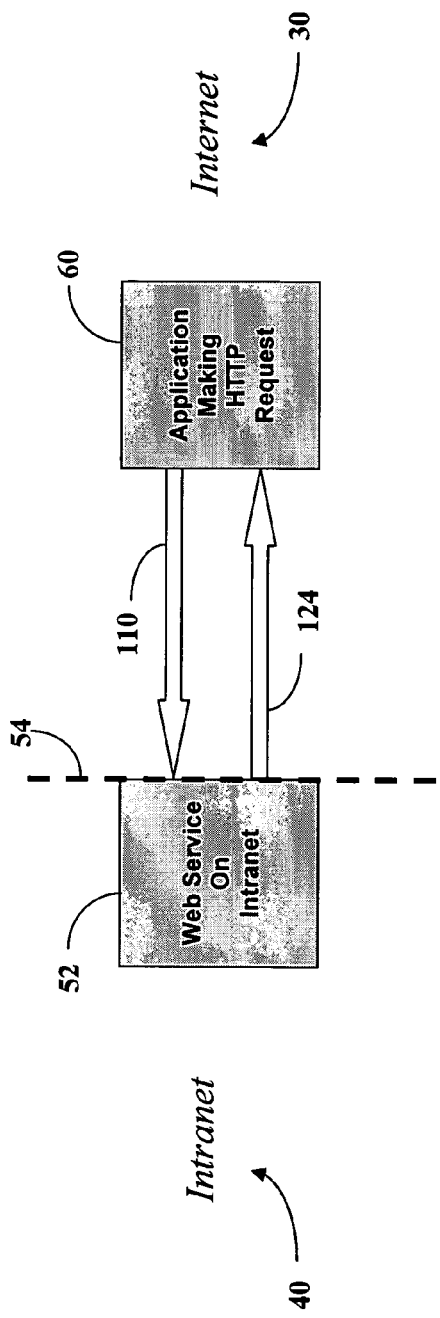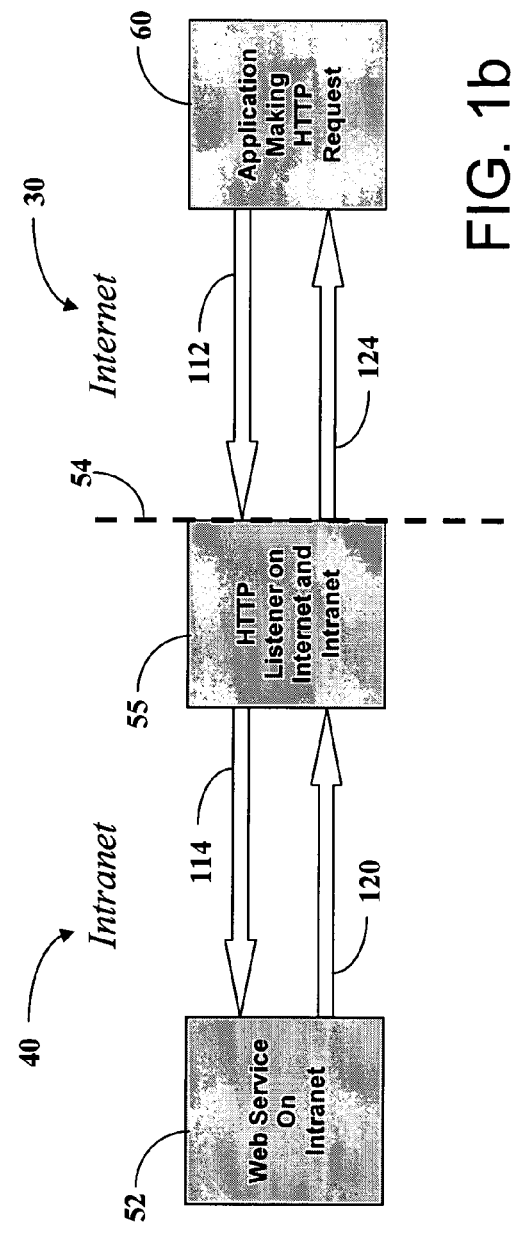

INTERNET LISTENER/PUBLISHER

BACKGROUND OF THE INVENTION

It is often desirable to allow an internet based application to send or receive information on demand to an Intranet based system that resides behind a firewall. The problem encountered in doing this, is that most corporate firewalls block inbound requests to internet protocol (IP) ports, such as port 80 used for HyperText Transfer Protocol (HTTP) and only allow outbound internet requests. Without the ability to make an inbound request it is not possible to call into an intranet based system. If inbound requests were not blocked, such requests could be used to obtain information from devices on an intranet for use in an internet application. Web services built on the Extensible Markup Language (XML) Simple Object Access Protocol (SOAP) make such requests through HTTP. If a customer on the intranet wishes to enable inbound requests he will usually have much trouble convincing his corporate IT department that the security risk is acceptable. This makes deploying a solution such as an HTTP server (i.e., web service) on an intranet that is accessible from the internet difficult if not impossible.

SUMMARY OF THE INVENTION

Briefly, in accordance with the foregoing, this invention describes an internet listener/publisher scheme, which allows for HTTP or HTTP layered over the Secure Socket Layer (HTTPS) inbound requests to be made into the intranet from the internet through the interaction of the publisher on the intranet and a listener outside a firewall on the internet.

Accordingly, it is an object of the present invention to provide a system for an internet-based user to access a system on an intranet where a firewall is operatively interposed between the internet and the intranet.

It is another object of the present invention to provide a system that enables the internet-based user to access and monitor devices which are connected to intranet-based systems where a firewall is operatively interposed between the internet and the intranet.

BRIEF DESCRIPTION OF THE DRAWINGS

In the drawings:

FIG. 1a, is a block diagram illustrating the blocking of internet HTTP requests by a firewall, FIG. 1b, is a block diagram showing a proxy scheme for internet HTTP access to an intranet based web service;

DETAILED DESCRIPTION OF THE ILLUSTRATED EMBODIMENT

Figure 2:
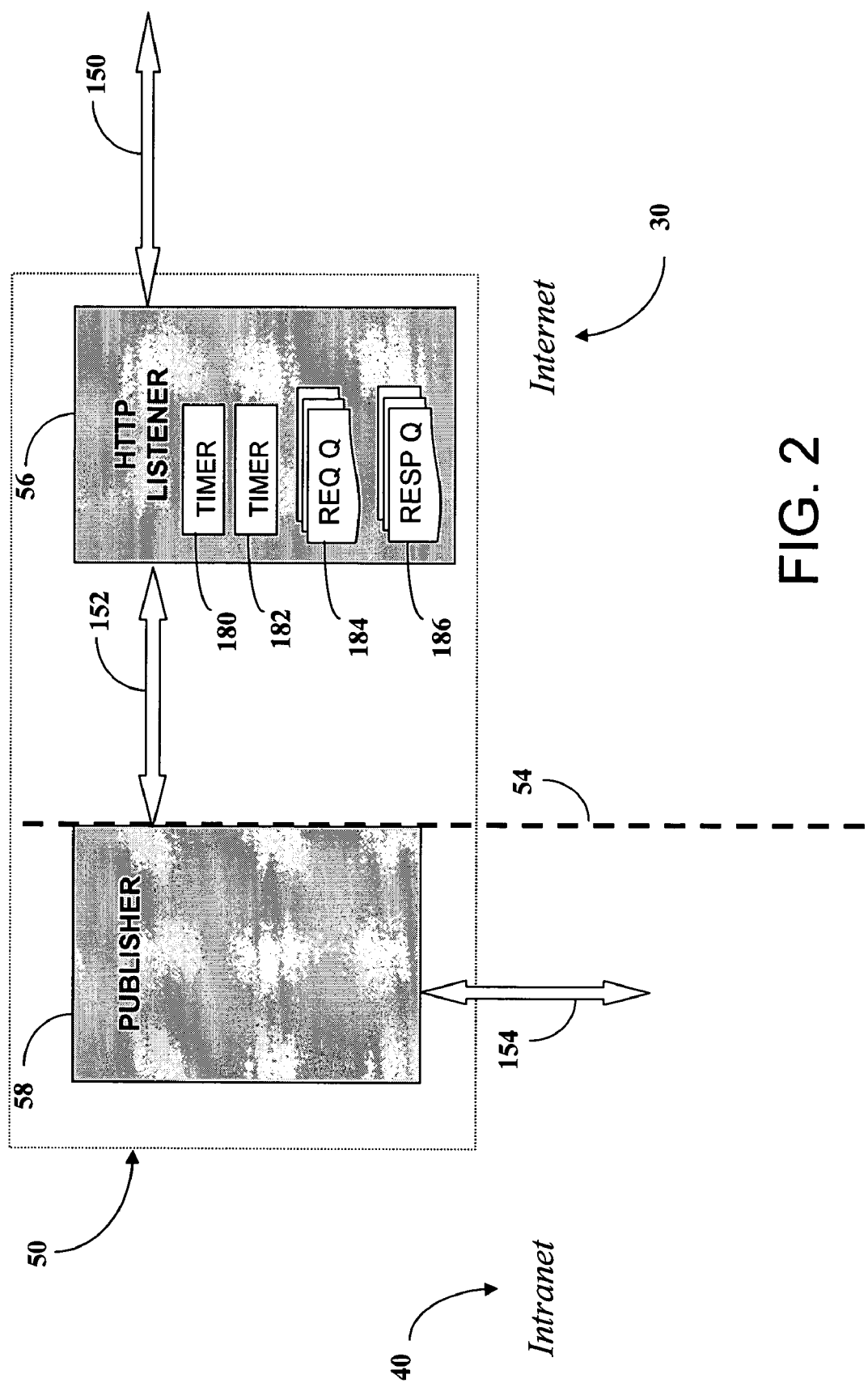
FIG. 2, is a block diagram of a preferred embodiment of an internet listener/publisher scheme.

Referring now to the drawings, and initially to FIG. 1a, an application 60 makes a an HTTP request 110 to a web service 52 on the intranet 40 side of a firewall 54. The internet application 60 expects to receive request response 124. However, most corporate firewalls as firewall 54, block inbound HTTP service requests 110 and only allow outbound requests.

One way around this is restriction is illustrated in FIG. 1b, where an HTTP listener 55 on the intranet 40 side of a firewall 54 acts as a proxy agent. In this particular implementation example the HTTP protocol is used. In order for an external application 60 to make a call into a web service 52 on an intranet 40 through the internet 30 it makes an HTTP proxy request 112 to the listener 55. The proxy request 112 can be a standard HTTP request with addition of a parameter indicating the intranet address of the web service 52 to call.

EXAMPLE http://www.HttpListener.com?Redirect-http://intranet/web-service

If a publisher parameter is used, it is set to "local" to signal to the listener 55 to not use a publisher. The additional parameter or parameters can be specified either as universal resource link (URL) parameters as part of the HTTP header, or included in the SOAP header.

EXAMPLE http://www.HttpListener.com?Redirect=http://intranet/webservice&PublisherURN-local Except for the extra parameters, it appears to the external application 60 that it is making the HTTP request to the listener 55. After the listener 55 receives a proxy request 112, it makes an HTTP service request 114 directly to the web service 52. The web service 52 then sends a web service response 120 which the listener 55 forwards out the internet as the service response 124 to the original requesting application 60.

This mode of operation has the drawback of undesirable firewall requirements. However, it could be useful within a demilitarized zone where the listener 55 has inbound and outbound access to the desired IP ports as well as access to the intranet 40.

Turning now to FIG. 2, a block diagram of the software processes adapted to carry out the present invention are shown. Specifically, the internet listener/publisher scheme 50 consists of a publisher 58, which resides on the intranet 40 side of a firewall 54 and a listener 56 which resides on the internet 30 side of the firewall 54. In this illustrative embodiment there is only one publisher 58 and one listener 56. One listener, however, can service multiple publishers. The publisher 58 and the listener 56 maintain a internet HTTP communication channel 152 between them.

The listener 56 contains facilities such as a response timer 180 and a no-response timer 182 which are used to maintain the communication channel 152. The listener 56 also maintains a request queue 184 for messages destined for the publisher 58 and a response queue 186 for messages destined for the internet 30. The listener 56 maintains an HTTP connection 150 to the internet during inbound HTTP requests.

The publisher 58 maintains an HTTP connection 152 with the listener 56. The publisher passes requests 154 onto the intranet that it received from the listener 56. The publisher 58 does not maintain an open intranet connection and has no timers. The only timeout that occurs for the publisher 58, is an HTTP protocol timeout to the web service on the intranet.

The publisher 58 requires that the desired outbound ports be open, HTTP or HTTPS, which is the default case for most corporate firewalls. The listener 56 requires that the communication ports are open for both inbound and outbound traffic. One listener 56 can reside on the internet 30 for many internet customers. Since the listener 56 does not require a connection to the intranet 40 there is less resistance from a customer's IT department to hosting it on the internet 30. An external hosting company, such as an internet service provider (ISP) for the listener 56 also becomes an option because the hosting company does not need access to the customer's intranet 40. The publisher 58 and the listener 56 may be integrated on any convenient platform including a network gateway, a network server, etc. as required by the installation and IT practices of the provider network.

Figure 3:
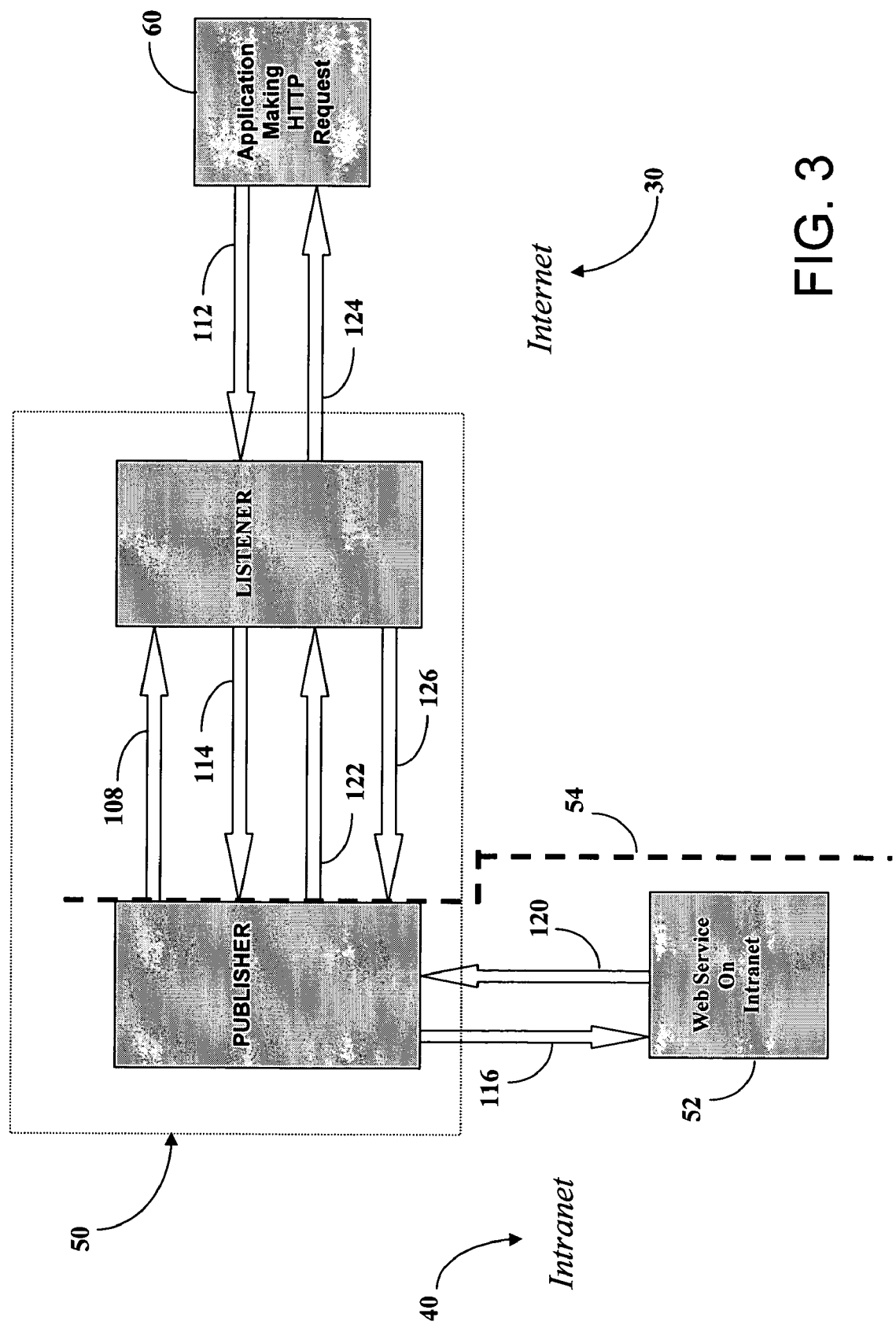
FIG. 3, is a block diagram of the communication flow of preferred embodiment of an internet scheme.

Turning now to FIG. 3, the communication flow of the internet listener/publisher scheme 50, according to one embodiment of the present invention, is shown. A publisher 58 and a web service 52 reside on the intranet 40 side of a firewall 54 and a listener 56 resides on the internet 30 side of the firewall 54. The internet listener/publisher scheme 50 allows for requests to be made into the intranet 40 from the internet 30 through the interaction of the publisher 58 and the listener 56.

According to one illustrative embodiment of the present invention, in order for an external application 60 to make a call into a web service 52 on an intranet 40 through the internet it makes a service request 112 to the listener 56. According to an alternative embodiment of the present invention, the service request 112 is a proxy request. The service request 112 can be a standard HTTP request with the addition of a parameter identifying the publisher for which the request is intended and a parameter identifying the intranet address of the web service 52. These parameters can be specified either as URL parameters part of an HTTP header or included in the SOAP header. Except for the extra parameters it appears to the external application 60 that it is making the HTTP request to the listener 56.

EXAMPLE http://www.HttpListener.com?Redirect-http://intranet/webservice&PublisherURN-http://Publisher.com The publisher 58 interacts with the listener 56 by keeping a constant HTTP connection open to the listener 56. The open connection is maintained by continually sending wait requests 108 to the listener 56, identifying the publisher 58 with a universal resource name (URN) indication. When the listener receives an proxy service request 112, for a publisher 58, it checks to see if the addressed publisher 58 has checked in (i.e., sent a wait request 108) within a reasonable amount of time. If a wait request 108 has been recently received, the listener 56:

A. Embeds the received proxy service request 112 within a return request 114 packet, B. assigns it a unique transaction identifier, and C. queues the return request 114 packet, in the request queue 184, to be sent to the publisher 58.

D. The request 112 is also placed in the response queue 186, which represents a queue of outstanding intranet requests.

If the publisher 58 has not checked in within a reasonable amount of time (i.e., a wait request 108 has not been recently received) a timeout or not available error is returned as a service request result 124 to the application 60.

All error conditions such as service time outs are carried transparently by the internet listener/publisher scheme 50. The error conditions can be either returned as an appropriate HTTP error response or in the case of a web service as more descriptive SOAP fault and will be handled appropriately at the application level. In any case, errors in the internet listener/publisher scheme will ultimately to mapped by the listener and returned in the response 124.

When the publisher 58 receives the return request 114, it forwards the embedded service request 112 as a web service HTTP request 116 to the addressed intranet web service 52. The web service 52 performs the required action (e.g., access to information, or access to a control system) which, results in the web service 52 sending web service response 120 message. The publisher 58 receives the web service response 120 and, forwards it to the listener 58 as return result 122 message. The listener 56 receives the return result 122 message, looks up the original proxy service request 112, in the response queue 186, using the transaction identifier and sends the contents of the publisher's response 122 as the web service response 124 to the original requesting application 60. The originating request is then cleared from the response queue 186. The internet application 60 that made the original proxy service request 112, perceives the request into the intranet 40 as a single request to the listener 56.

The listener 56, also returns the status of the post 122 to the publisher 58 in the status response 126. This status response 126 can be logged to detect failures between the listener 56 and the publisher 58.

Figure 4:
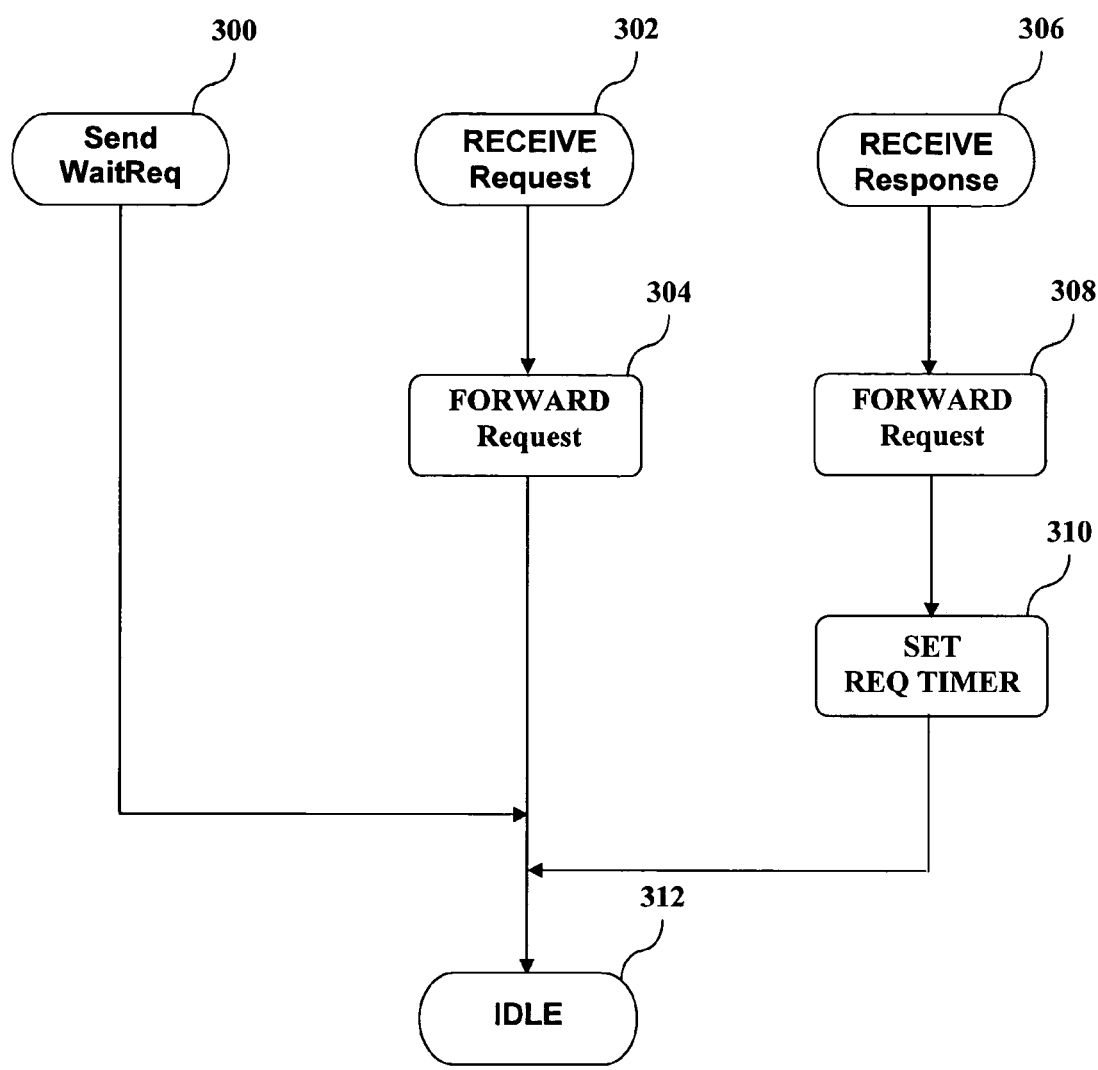
FIG. 4, is a task flow chart of the publisher describing the timing of the communication link with the listener.

Turning now to FIG. 4, a high level flowchart of the communication task activity of the publisher 58 is shown. Communications between the listener 56 and publisher 58 is controlled by the publisher. To keep a communication channel open to the listener 56, the publisher 58 must maintain a reliable and continuous stream of wait requests 108. This may be accomplished by any of the known software techniques as required by the communication resources, queuing resources and tasking environments of the publisher 58 and of the listener 56. Step 312 represents an idle task state for the activity of the publisher 58. When a return request 114 is received at step 306, the embedded request in the request 114 is stripped at step 308, and forwarded on the intranet to the addressed web server 52, as a web service request 116, at step 310. The publisher 58 idles at step 312.

When the publisher 58 receives a web service response 120 from the web server at step 302 it passes the response along to the listener as a return result 122 message at step 304 and idles at step 312.

At step 300, a wait request message 108 is sent to the listener 56. The periodicity of the wait request messages to a listener 56, may be controlled by a task clock, a polling technique or in response to listener 56 activity, as required by the operating system hosting the publisher 58 and, as would be obvious to one skilled in the art of communication task processing.

Figure 5:
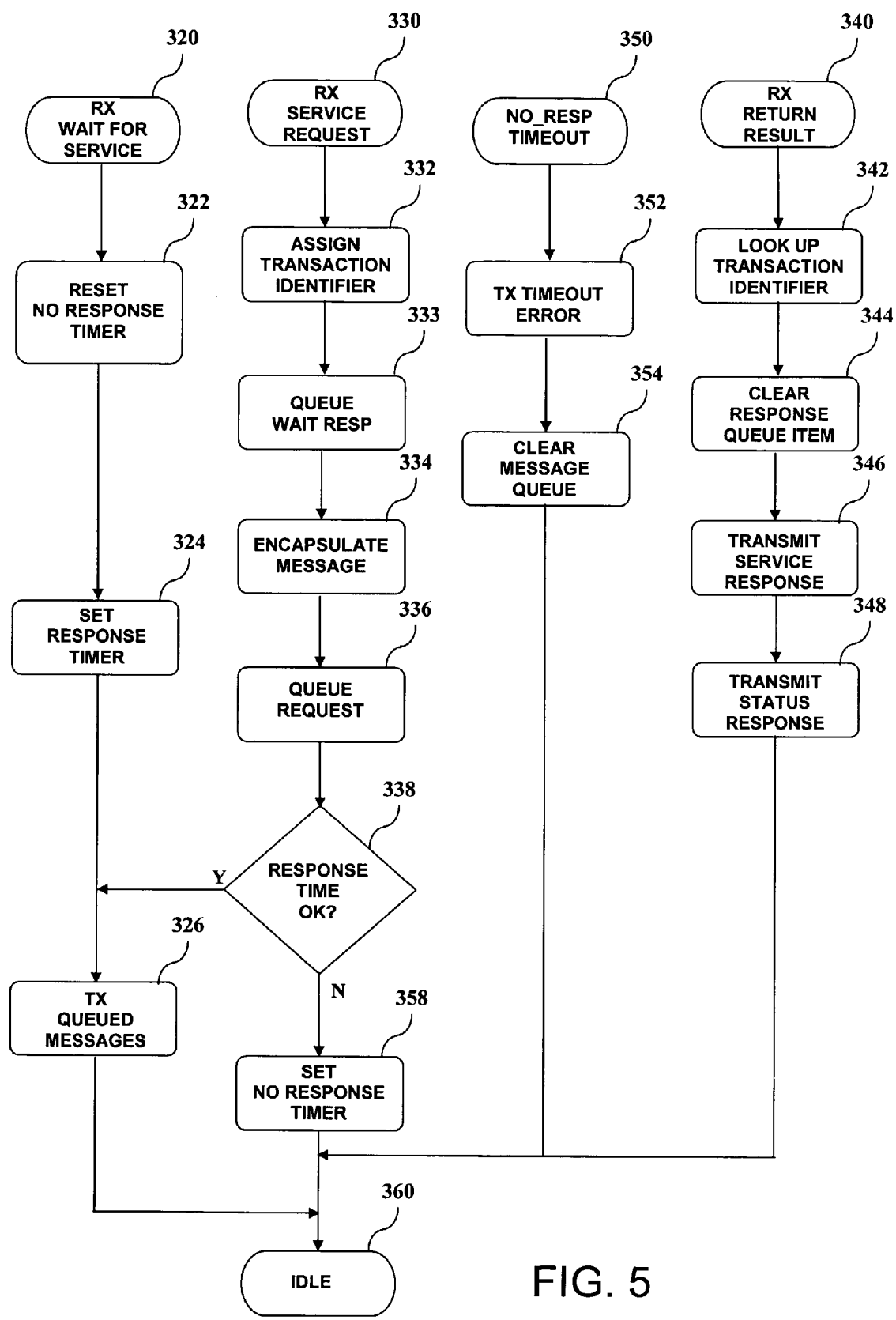
FIG. 5, is a task flow chart of the listener describing the timing of the communication link with the publisher.

Turning now to FIG. 5, a flowchart of the communication task activity of the listener 56 is shown. When the listener 56 receives a wait request 108 from the publisher at step 320 it resets any pending no response timer 182 at step 322, and at step 324 sets a response timer 180 to indicate when the publisher 58 has last communicated. Then, any queued messages are sent to the publisher 58 at step 326 (in the form of return request 114 messages) and the task idles at step 360.

When the listener 56 receives a service request 112 at step 330, it assigns the request 112 a transaction identifier at step 332 and queues the request in the wait for response queue 186 at step 333. Next, the request 112 is embedded in the form of a return request 114 at step 334, and queued in the request queue 184 for transmission to the publisher, at step 336. At step 338 the response timer 180 is checked to see if the publisher 58 had recently communicated. If the response timer 180 has not timed out at step 338, then any service request 114 messages in the request queue 184 are sent to the publisher 58 at step 326 and the task is idled at step 360. If the response timer 180 has timed out at step 338, then a no response timer 182 is set at step 358 for a reasonable amount of time to check for an inactive or otherwise uncommunicative publisher. The service request 114 will remain in the queue and the task is idled at step 360.

If the no response timer times out at step 350, the publisher 58 is not communicating. In this case, an error is returned as a result of the web service request 124 for each queued service request 114 at step 352 and the message queue 184 is cleared at step 354 before idling the task at step 360.

When a return result message 122 is received from the publisher 58 at step 340, the transaction identifier is used at step 342 to look up the originating request in the response queue. At step 344 the entry in the response queue is cleared. If an entry is not found in the response queue then the return result message 122 is cleared as no valid originating request currently exists for this transaction. At step 346, the return result message 122 is then transmitted on the internet 30 as a service response message 124 to the originating application 60. A status response message 126 may also be sent to the publisher 58 for logging and tracking purposes.

The internet listener/publisher can be utilized in any application where is it is advantageous to make a request from the internet to the intranet using only an inbound IP port. It is most useful to use it to make calls in SOAP web services. One application of the invention is to access data from Square D PowerLogic® circuit monitors utilizing Web Services in the Powerlogic® Power Server and/or System Manager Software (SMS-3000) products. Another application is to be used in an enterprise wide system to collect data from several intranet web services through the internet including power quality and/or billing applications.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A communication system responsive to internet user access requests to an intranet-based web server across a firewall, comprising:
a listener on said internet side of said firewall responsive to said access requests from said internet user, and
a publisher on said intranet side of said firewall having access to said web server, maintaining a communication link with said listener, wherein said listener embeds said access requests within responses to communication requests from said publisher.

2. A communication system as recited in claim 1, wherein said publisher maintains an open hypertext transfer protocol (HTTP) or HTTP layer over the secure socket layer (HTTPS) connection with said listener.

3. A communication system as recited in claim 1, wherein said listener maintains an HTTP or HTTP layered over the secure socket layer (HTTPS) Internet connection.

4. A communication system as recited in claim 1, wherein said listener embeds requests of its own within responses to communication requests from said publisher.

5. The communication system of claim 1, wherein said publisher allows outbound traffic only.

6. A method of communicating intranet services access requests from an internet user across a fire wall to an intranet-based web service, including:
maintaining a communication link between an intranet publisher and said web server;
maintaining a communication link between an internet listener and said internet user;
maintaining a communication link between said publisher and said listener; and
embedding, by said internet listener, said internet user access requests within responses to communication requests from said publisher.

7. The communication method of claim 6 using an HTTP or HTTP layered over the secure socket layer (HTTPS) connection between said publisher and said listener.

8. The communication method of claim 6 in which said listener maintains an HTTP or HTTPS internet connection.

9. The method of claim 6, wherein said intranet publisher allows outbound traffic only.

10. A method of communicating intranet services access requests from a requesting internet user, across a firewall, to an intranet-based service, including:
receiving communication requests from the intranet side of a firewall;
receiving said access request from said internet user on the internet side of said firewall;
encapsulating, on the internet side of said firewall, said access request in a response message;
sending said response message in response to said communication request from the internet side across said firewall to the intranet side;
forwarding said response message to an intranet-based web service;
forwarding outward bound intranet-based web service responses across a firewall; and
forwarding said intranet-based web service responses to said requesting internet user.

11. The communication method of claim 10 and further, wherein said access request is assigned a transaction ID.

12. The communication method of claim 10 and further, wherein said web service response is forwarded to said internet user based on said transaction ID.

13. The communication method of claim 10 and further, wherein said access request fails if said communication request has not been received within a timeout period.

14. The communication method of claim 10 and further, wherein said communication request is an HTTP wait request.

15. The communication method of claim 10 and further, wherein said access request is over an HTTP or HTTPS connection.

16. The communication method of claim 10 and further, wherein said communication request is over an HTTP connection.

17. The method of claim 10, further comprising disallowing, on the intranet side of said firewall, inbound access requests from said internet user.

* * * * *